(12) United States Patent
Marquez-Santoyo et al.

(10) Patent No.: US 11,193,292 B2
(45) Date of Patent: Dec. 7, 2021

(54) NUCLEAR POWER PLANT HAVING A PROTECTIVE SUPERSTRUCTURE

(71) Applicant: ROLLS-ROYCE POWER ENGINEERING plc, Derby (GB)

(72) Inventors: Jose A Marquez-Santoyo, London (GB); Mark J Richardson, London (GB); Gareth Edwards, London (GB); Paul C Smith, Warrington (GB)

(73) Assignee: ROLLS-ROYCE POWER ENGINEERING PLC, Derby (GB)

( * ) Notice: Subject to any disclaimer, the term of this patent is extended or adjusted under 35 U.S.C. 154(b) by 177 days.

(21) Appl. No.: 16/609,683

(22) PCT Filed: May 21, 2018

(86) PCT No.: PCT/EP2018/063247
§ 371 (c)(1),
(2) Date: Oct. 30, 2019

(87) PCT Pub. No.: WO2018/215382
PCT Pub. Date: Nov. 29, 2018

(65) Prior Publication Data
US 2020/0199902 A1    Jun. 25, 2020

(30) Foreign Application Priority Data
May 23, 2017  (GB) ..................................... 1708234

(51) Int. Cl.
*E04H 5/02*    (2006.01)
*E04H 9/14*    (2006.01)
(Continued)

(52) U.S. Cl.
CPC ............... *E04H 5/02* (2013.01); *E04H 9/145* (2013.01); *G21C 13/093* (2013.01); *G21D 1/04* (2013.01); *E04B 1/32* (2013.01)

(58) Field of Classification Search
CPC ................ E04H 5/02; E04H 9/04; E04B 1/32
See application file for complete search history.

(56) References Cited

U.S. PATENT DOCUMENTS

| 3,118,818 A | 1/1964 | Bray | |
| 4,050,252 A * | 9/1977 | Nakanishi | ............... F01K 23/04 60/641.6 |

(Continued)

FOREIGN PATENT DOCUMENTS

| DE | 101 50 852 A1 | 5/2003 |
| GB | 1184121 A | 3/1970 |

(Continued)

OTHER PUBLICATIONS

Nov. 21, 2017 Search Report issued in British Patent Application No. GB1708234.8.
(Continued)

*Primary Examiner* — Lily C Garner
(74) *Attorney, Agent, or Firm* — Oliff PLC

(57) ABSTRACT

A nuclear power plant having a protective superstructure including a first end region configured to cover a nuclear reactor in a containment structure, a second end region opposite the first end region and configured to cover a cooling water pump house, and a central region between the first and second end regions and configured to cover a turbine hall. The superstructure has an oval-shaped plan profile, the oval having a greater degree of curvature at the first end region than at the second end region.

9 Claims, 5 Drawing Sheets

(51) Int. Cl.
*G21C 13/093* (2006.01)
*G21D 1/04* (2006.01)
*E04B 1/32* (2006.01)

(56) References Cited

U.S. PATENT DOCUMENTS

| | | | |
|---|---|---|---|
| 4,088,535 A | 5/1978 | Thompson et al. | |
| 4,613,253 A * | 9/1986 | Marshall | G21D 1/00 405/195.1 |
| 7,269,926 B1 * | 9/2007 | Rakosi | E04B 1/32 52/81.1 |
| 7,978,806 B1 * | 7/2011 | Hayman, III | G21C 13/024 376/317 |
| 2014/0013699 A1 * | 1/2014 | Gallinat | E04B 2/62 52/583.1 |
| 2017/0074034 A1 * | 3/2017 | Lorenzo | E04H 9/14 |

FOREIGN PATENT DOCUMENTS

| | | |
|---|---|---|
| JP | H10-195980 A | 7/1998 |
| JP | 2012246714 A * | 12/2012 |
| RU | 2 081 464 C1 | 6/1997 |
| WO | 02/33186 A1 | 4/2002 |

OTHER PUBLICATIONS

Oct. 31, 2018 Search Report issued in International Patent Application No. PCT/EP2018/063247.

Oct. 31, 2018 Written Opinion of the International Searching Authority issued in International Patent Application No. PCT/EP2018/063247.

* cited by examiner

NUCLEAR POWER PLANT HAVING A PROTECTIVE SUPERSTRUCTURE

CROSS-REFERENCE TO RELATED APPLICATIONS

This specification is based upon and claims the benefit of priority from United Kingdom patent application number GB 1708234.8 filed on May 23, 2017 and the entire contents of which are incorporated herein by reference.

BACKGROUND

Field of the Disclosure

This disclosure relates to nuclear power plant having a protective superstructure.

Description of the Related Art

Nuclear power plants are typically built near to large bodies of water to supply their need for coolant. Whilst some are situated adjacent to rivers, most are sited in coastal locations. In doing so, there is a need to mitigate flood of the plant due to excessive wave overtopping, extreme tides, storm surges, or even seismically-initiated tsunami.

Whilst attempts are typically made to prevent flooding of nuclear power plants by installation of coastal defences such as seawalls, if an extreme enough event occurs these may be quickly overwhelmed and the plant left vulnerable.

There is therefore a need for other approaches to mitigate flood risk, whilst continuing to provide the requisite level of impact resistance to safeguard against a malicious aircraft or land vehicle strike.

SUMMARY

The invention is directed towards a nuclear power plant with a protective superstructure. The plant is located adjacent to a body of water, the plant comprising, in order of distance from the body of water a cooling water pump house, a turbine hall, and a nuclear reactor in a containment structure. The power plant also has a protective superstructure which comprises a first end region configured to cover the containment structure, a second end region opposite the first end region configured to cover the cooling water pump house, and a central region between the first and second end regions configured to cover the turbine hall. The superstructure has an oval-shaped plan profile, the oval having a greater degree of curvature at the first end region than at the second end region.

This particular configuration of the oval-shaped plan profile may operate to reduce the pressure differential between the first and second end regions should water flow around the superstructure in a flooding event.

BRIEF DESCRIPTION OF THE DRAWINGS

Embodiments will now be described by way of example only with reference to the accompanying drawings, which are purely schematic and not to scale, and in which.

DETAILED DESCRIPTION OF THE DISCLOSURE

Figure 1:
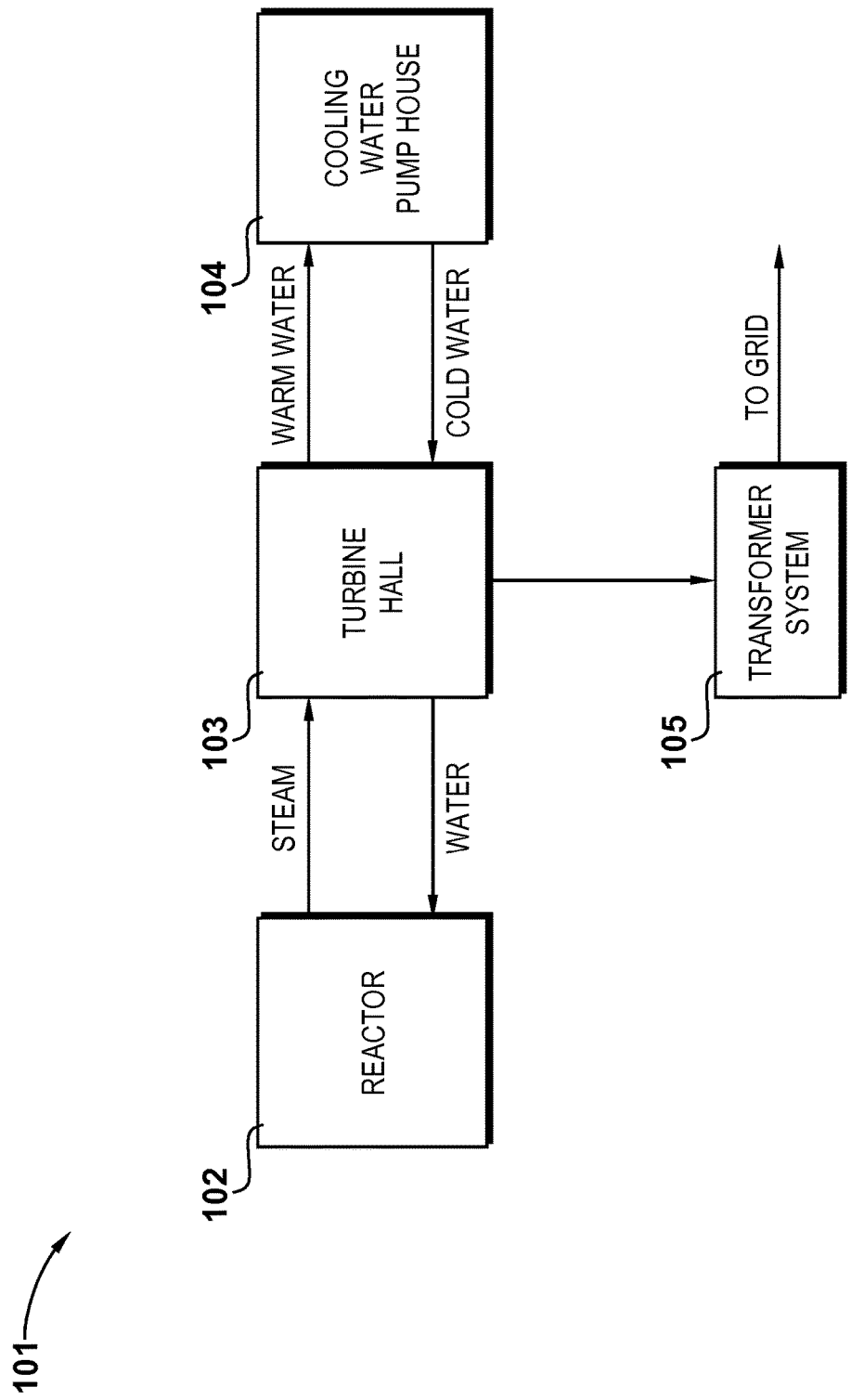
FIG. 1 shows a block diagram of the primary functions of a nuclear power plant according to the present invention.

A block diagram of the primary functions of a nuclear power plant is shown in FIG. 1. The nuclear power plant, indicated generally at 101, is in the present example a small modular reactor (SMR). SMRs are smaller than conventional nuclear power plants, and assembled from component parts manufactured offsite.

As is typical with nuclear power plants, the nuclear power plant 101 is split into several different sections termed islands. The nuclear reactor 102 itself is located in an appropriate containment structure on a reactor island, a turbine 102 is located in a hall on a turbine island, and a cooling water pump house 104 is located on a cooling island. In practice, the nuclear power plant 101 operates in the conventional manner, in that heat from nuclear fission in the reactor 102 raises steam, which is expanded through the turbine in accordance with the Rankine cycle. The steam condenses and is then returned as water to the reactor. In conjunction with this, heat is removed from the turbine stage by the cooling water pump house, which passes cold water to the turbine where it absorbs heat and is returned to the cooling water pump house. Electricity from the turbine is converted by a transformer system 105 before being provided to a grid.

Figure 2:
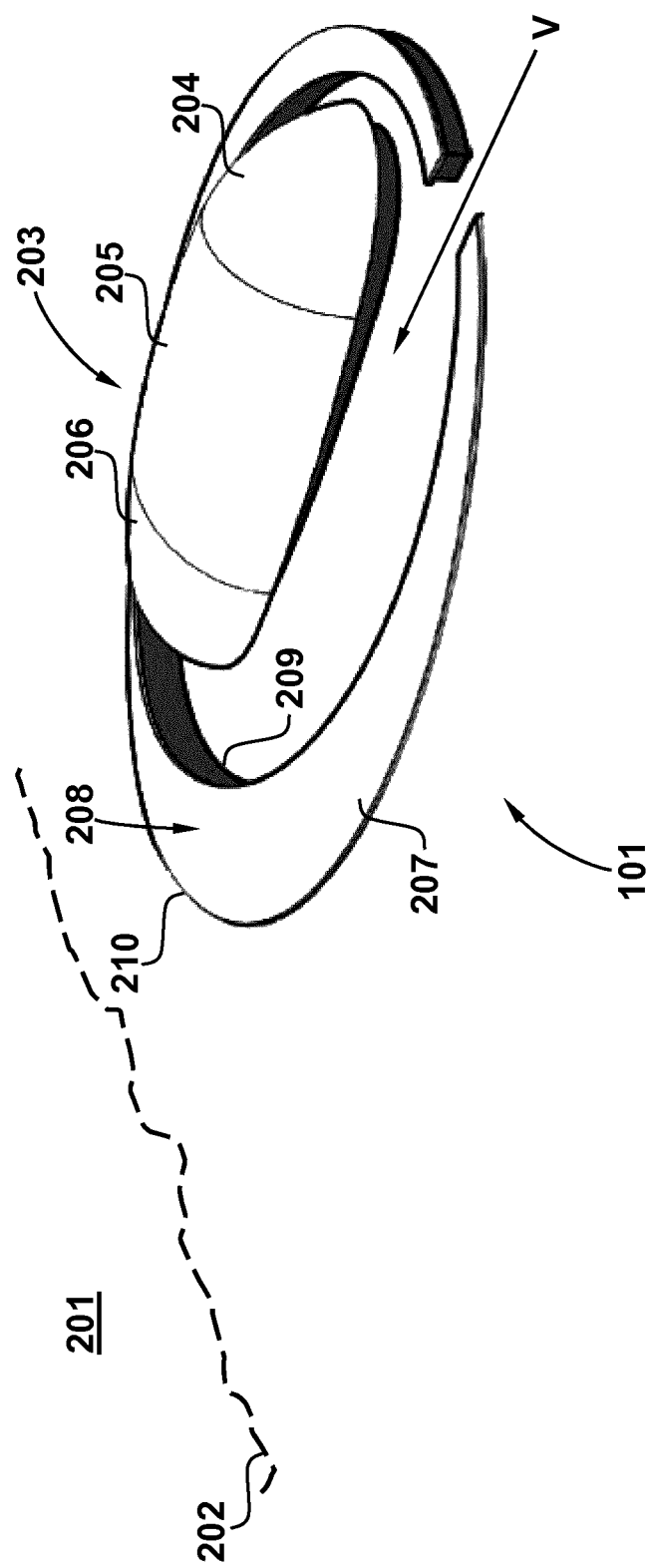
FIG. 2 shows a perspective view of the nuclear power plant of FIG. 1.

A perspective view of the nuclear power plant 101 is shown in FIG. 2. As is typical, the nuclear power plant 101 is located adjacent to a body of water, in this example the sea 201, which is demarcated by a coastline 202. In this way, cooling water for use in the plant is readily available.

However, as described previously, there is an attendant risk of flooding of the nuclear power plant in such a location due to extreme tides or waves.

The nuclear power plant 101 therefore comprises a protective superstructure 203. In the present embodiment, the protective superstructure comprises three regions: a first end region 204, a central region 205 and a second end region 206 at the opposite end to the first end region.

As will be described with reference to FIGS. 3 to 5, the protective superstructure 203 adopts a shape and configuration which covers and protects the three islands identified in FIG. 1, namely the nuclear reactor, the turbine hall, and the cooling water pump house. Primarily, the protective superstructure 203 has an oval-shaped plan profile, having a greater degree of curvature at the first end region 204 than at the second end region 206. As described previously, it is contemplated that the oval-shaped profile will operate to reduce the pressure differential between the first and second end regions, should water flow around the protective superstructure 203 in a flooding event originating from the sea 201.

Referring again to FIG. 2, the nuclear power plant 101 also comprises a berm 207 that surrounds the three islands covered by the protective superstructure 203. In the present example, the berm 207 is of arcuate form, comprising a gap to allow vehicles to enter a central zone 210, as indicated by the arrow V. This allows supplies to be brought in to the nuclear power plant 101 in close proximity to the three islands. In the present embodiment, at least in the part of the berm facing the coastline 202, indicated at 208, the berm 207 has an inner edge 209 which is raised with respect to its outer edge 210. Should a flooding event occur, originating from the sea 201, it is contemplated that the berm will assist in diverting water around the whole nuclear power plant 201.

As will be described with reference to FIG. 3, in the present embodiment the berm 207 houses various auxiliary services for the nuclear power plant.

Figure 3:
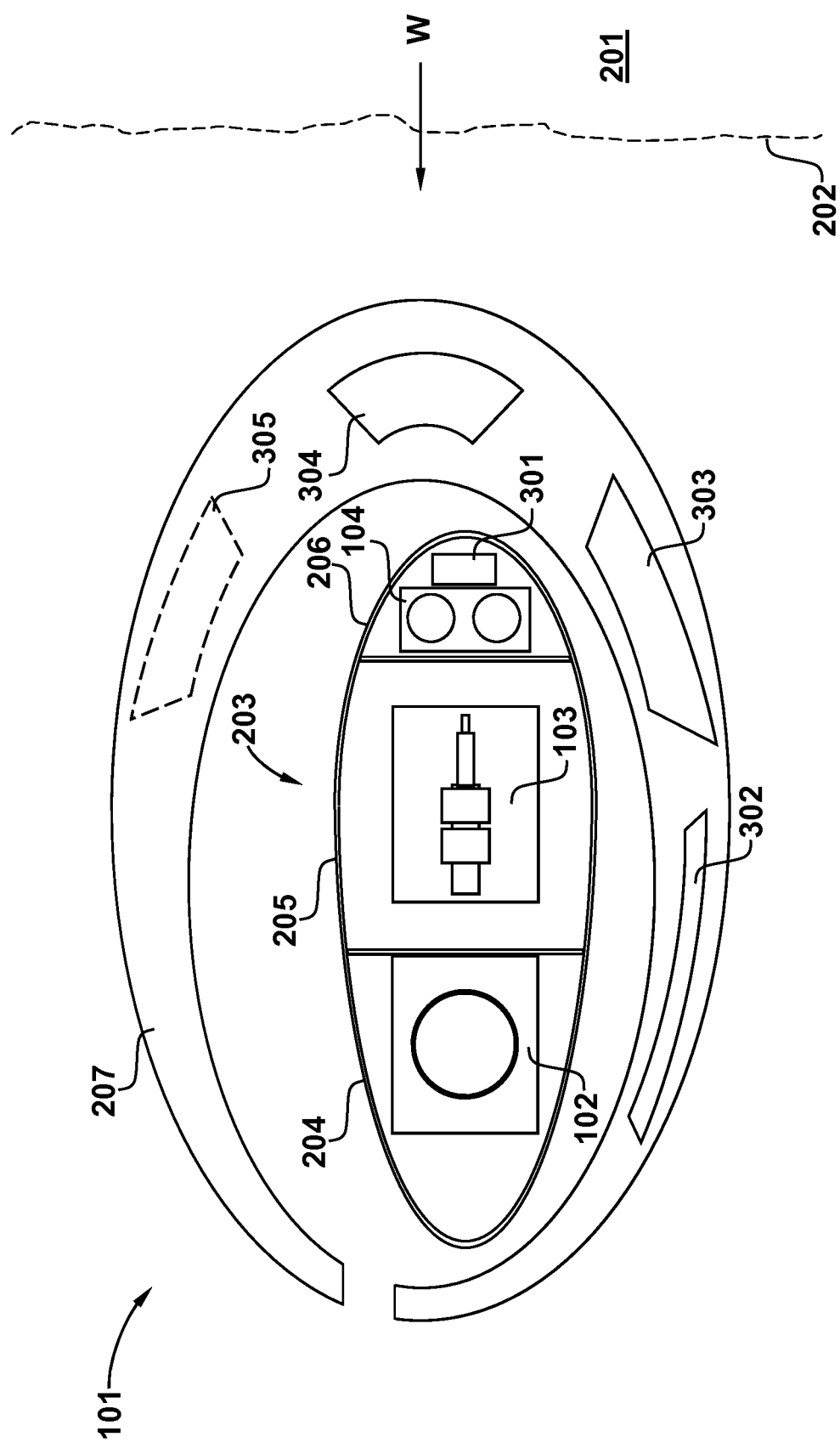
FIG. 3 shows a plan view of the nuclear power plant of FIG. 1 at ground level.

The nuclear power plant 101 is shown in plan view at ground level in FIG. 3.

As can be seen in the Figure, the nuclear power plant 101 comprises, in order of distance from the sea 201, the cooling water pump house 104, shown in the present embodiment with attendant forebay 301, the turbine 103 in a hall, and then the reactor 102 in its attendant containment structure. The protective superstructure 203 covers these parts of the power plant. In particular, the first end region 204 covers the reactor 102, the central region 205 covers the turbine 103, and the second end region 206 covers the cooling water pump house 104 (and forebay in the illustrated embodiment).

As described previously, the protective superstructure 203 has an oval-shaped plan profile. The oval is configured such that there is a greater degree of curvature at the first end region 204 than at the second end region 206. In terms of hydrodynamics, this assists in reducing the pressure difference between the two ends in the event of a tidal surge or a tsunami coming inland in the direction of the arrow W.

In addition, it will be appreciated that the addition of the berm 207 assists in reducing the total amount of water that will need flow around the protective superstructure 203.

The berm 207 also serves to provide massing to protect the various auxiliary services for the nuclear power plant 101, such as a transformer compound 302 where the transformer system 105 is located, a backup power generation system 303 comprising, for example, diesel generators, and a spent fuel store 304. Further auxiliary services 305 may also be located in the berm, such as the control room, offices, workshops, labs, etc.

Figure 4:
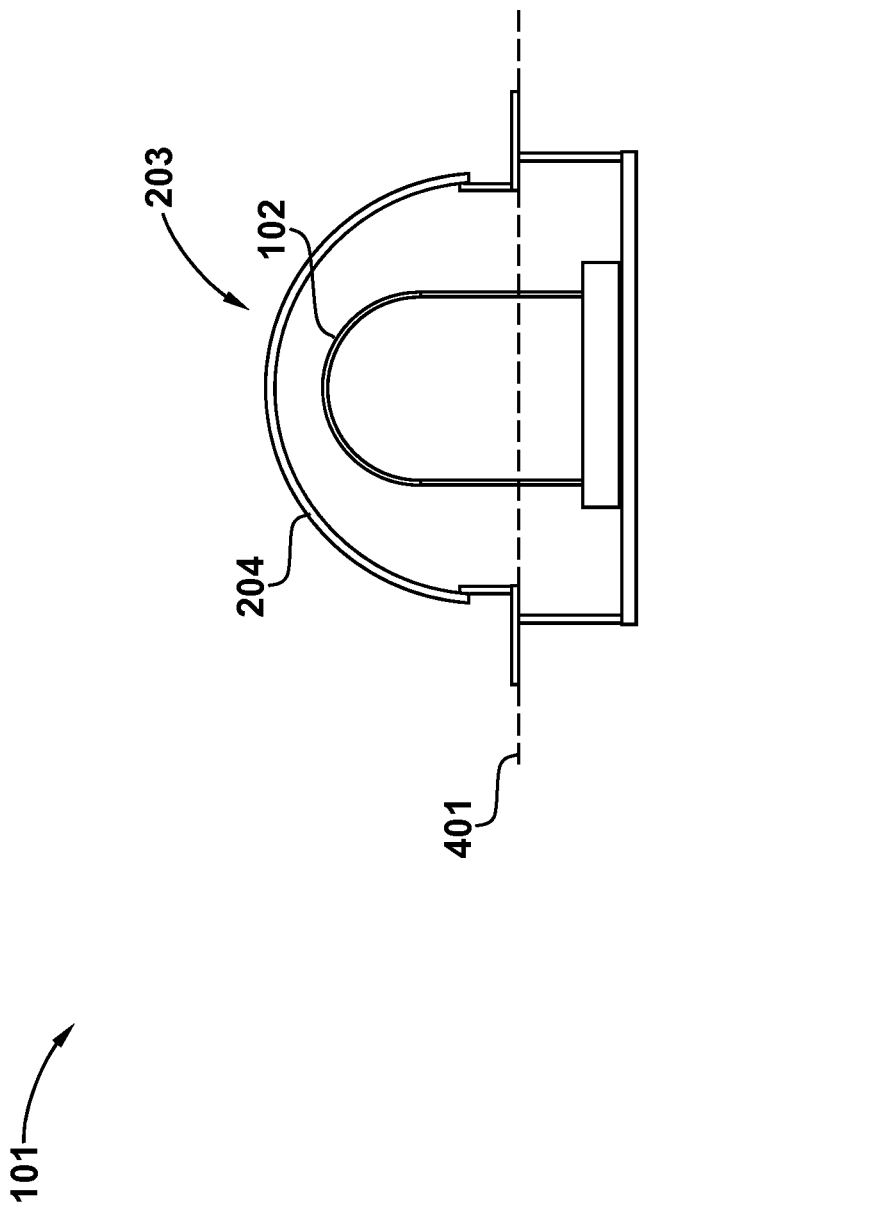
FIG. 4 shows a transverse section of the nuclear power plant.

A transverse section of the reactor island is shown in FIG. 4.

The nuclear reactor 102 is shown and in the present example extends below ground level 401. The protective superstructure 203 has in the transverse section, a generally arcuate profile. The arcuate profile is adopted for the whole longitudinal extent of the protective superstructure 203. In this way, for any longitudinal point, the transverse section of the protective superstructure 203 forms an arch to aid in structural integrity.

For the first end region 204, the transverse profile of the protective superstructure 203 is circular-arcuate to assist with aircraft impact resistance. The first end region 204 comprises, in the present example, reinforced concrete. In this way, the reactor 102 is protected from malicious aircraft impact. The reinforced concrete is operative to not only absorb the energy from such an impact, but, in addition, prevents excessive vibration causing structural failure in, for example, an earthquake. The reinforced concrete structure of the first end region 204 may be constructed using standard in-situ techniques, in which a temporary framework and external skin are used to form the requisite shape, or using permanent steel form work with on-site concrete infill during construction.

Alternatively, it is contemplated that in an embodiment the first end region 204 may be constructed from a plurality of pre-cast reinforced concrete sections. In an example, the sections are arches that are cast off-site and joined during construction work. In a further example, the arches themselves may be composed of a plurality of reinforced concrete panels, which again are formed off-site and joined together to form the first end region 204.

In an alternative embodiment, the first end region 204 may be made of carbon fibre panels or glass fibre-reinforce polymer panels on a space frame that creates a crash structure to absorb aircraft impact.

The central region 205 and second end region 206, covering the turbine and cooling water pump house respectively, have less onerous requirements in terms of mitigation of airborne attacks.

Thus, in the present embodiment, the central region 205 comprises an arched portal frame having an outer shell attached to it. The portal frame may include a number of trusses, which in a specific embodiment, may have purlins connecting them to aid stability. The outer shell may be formed of polycarbonate panels, due to their light weight, but alternatively carbon fibre or glass fibre-reinforced panels could be used.

The end region 206 may comprise one or more steel frame trusses, possibly including secondary columns to reduce their span. To the one or more trusses would again be attached an outer shell. The outer shell may be formed of carbon fibre or glass fibre-reinforced panels due to their resilience for coastal defence, but alternatively polycarbonate panels could be used.

Figure 5:
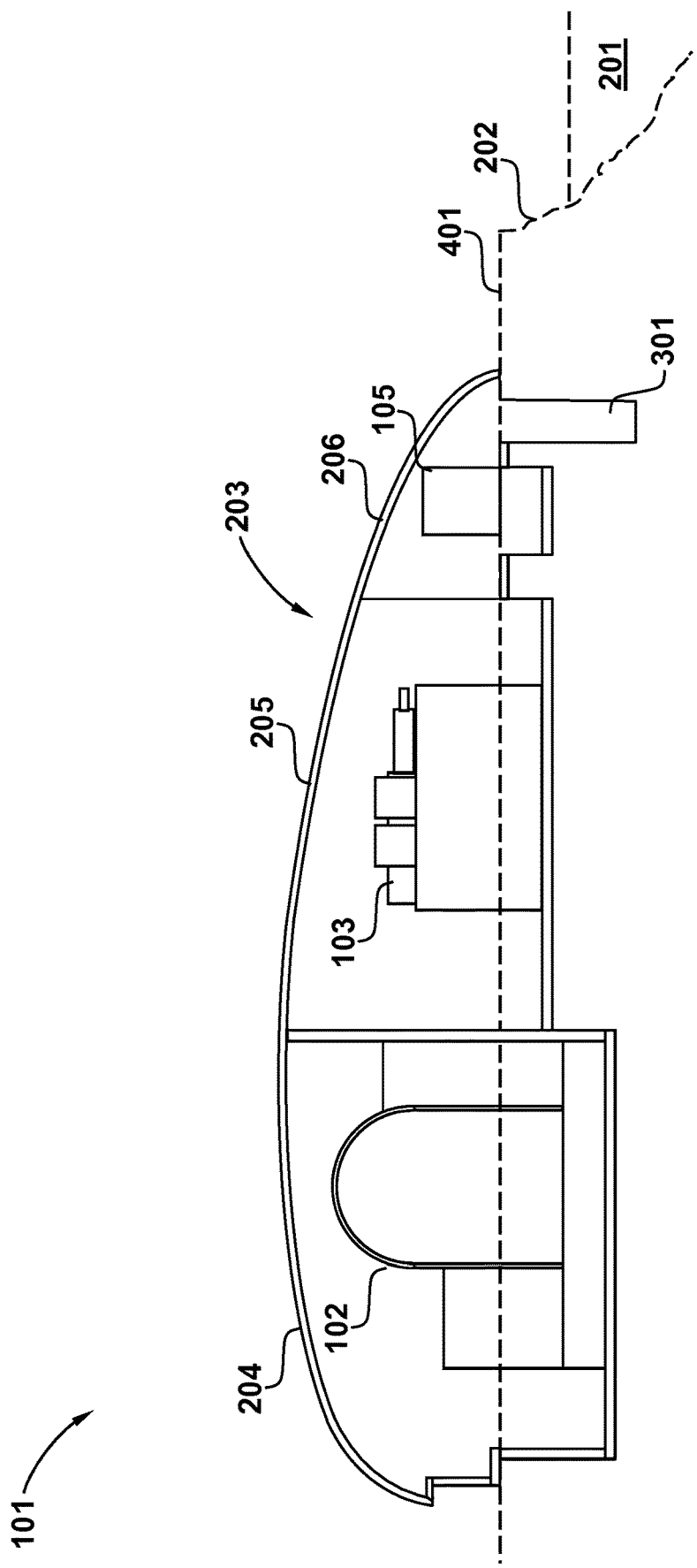
FIG. 5 shows a longitudinal section of the nuclear power plant.

A longitudinal section of the three islands under the protective superstructure 203 is shown in FIG. 5.

As can be seen from the Figure, in the present embodiment the first end region 204 of the protective superstructure 203 also adopts a circular-arcuate profile in the longitudinal direction. This is again to provide sufficient resilience should an impact occur.

The central region 205 has a tapering longitudinal profile in the direction from the first to the second end region. This assists in terms of reducing the overall surface area of the protective superstructure, and hence the amount of covering material and weight thereof.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

We claim:

1. A nuclear power plant located adjacent to a body of water, the plant comprising, in order of distance from the body of water:
   a cooling water pump house,
   a turbine hall, and
   a nuclear reactor in a containment structure;
   the nuclear power plant having a protective superstructure which comprises:
      a first end region configured to cover the containment structure,
      a second end region opposite the first end region in a longitudinal direction and configured to cover the cooling water pump house, and
      a central region between the first and second end regions configured to cover the turbine hall,
   wherein the superstructure has an oval-shaped plan profile, the oval having a greater degree of curvature at the first end region than at the second end region.

2. The nuclear power plant of claim 1, in which the protective superstructure has an arcuate transverse profile so as to form an arch at any point along the superstructure in a transverse direction orthogonal to the longitudinal direction.

3. The nuclear power plant of claim 1, in which the first end region of the protective superstructure has a circular-arcuate profile in the longitudinal direction.

4. The nuclear power plant of claim 1, in which the central region of the protective superstructure has a tapering longitudinal profile in the longitudinal from the first to the second end region.

5. The nuclear power plant of claim 1, in which the protective superstructure comprises reinforced concrete shell at the first end region.

6. The nuclear power plant of claim 1, further comprising a berm surrounding the plant.

7. The nuclear power plant of claim 6, in which the berm is of arcuate form with an inner edge that is raised relative to an outer edge of the berm.

8. The nuclear power plant of claim 7, in which the berm contains one or more of the following:
   backup power generation facilities;
   a transformer system; and
   a spent fuel store.

9. The nuclear power plant of claim 1, wherein the plant is on-shore.

\* \* \* \* \*